Figure 5:
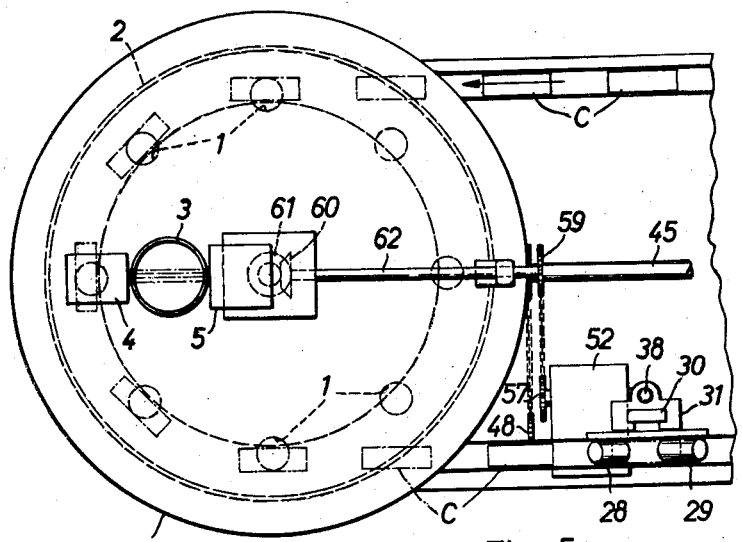

Feb. 4, 1964  U. BAUDER ETAL  3,120,607
VOLUMETRIC DISPENSING DEVICE WITH RADIOACTIVE CONTROL MEANS
Filed Jan. 11, 1960  2 Sheets-Sheet 1
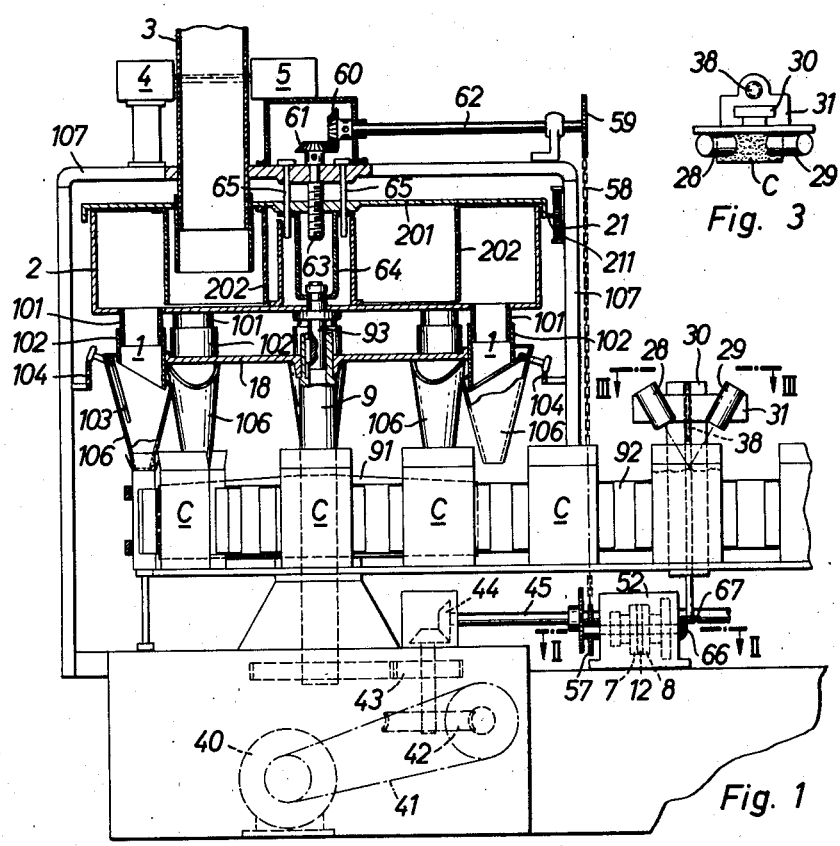
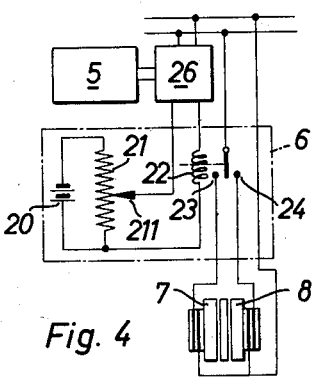
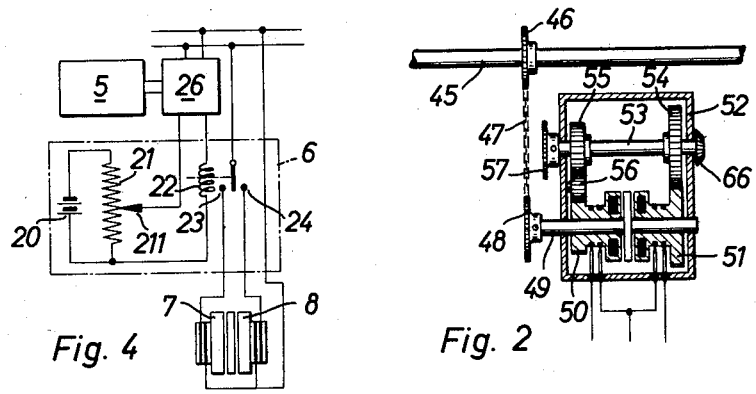

Feb. 4, 1964        U. BAUDER ETAL        3,120,607

VOLUMETRIC DISPENSING DEVICE WITH RADIOACTIVE CONTROL MEANS

Filed Jan. 11, 1960        2 Sheets-Sheet 2

3,120,607
VOLUMETRIC DISPENSING DEVICE WITH RADIOACTIVE CONTROL MEANS
Ulrich Bauder, Stuttgart, and Otto Barthelmess, Stuttgart-Bad Cannstatt, Germany, assignors to Firma Fr. Hesser Maschinenfabrik-Aktiengesellschaft, Stuttgart-Bad Cannstatt, Germany, a corporation of Germany
Filed Jan. 11, 1960, Ser. No. 1,610
Claims priority, application Germany Jan. 12, 1959
2 Claims. (Cl. 250—43.5)

Our invention relates to volumetric dispensing devices having means measuring continuously the density of the material supplied to the device, and means adapted to adjust the dispensing means of the device in accordance with the measurements obtained by the said measuring means.

For this purpose, the present invention uses a radiation type density measuring device comprising a source of radioactive radiation and a detector disposed at the supply conduit of the dispensing machine in such a manner that the supply conduit is located between the radiation source and the detector to enable said apparatus to continuously measure the density of the material flowing to the dispensing means.

Figure 6:
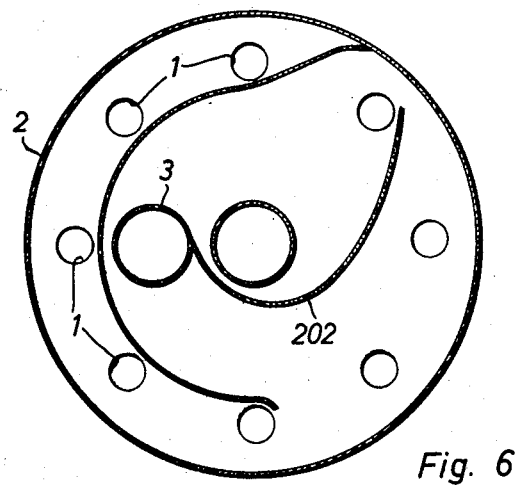

This arrangement has the advantage that it is simple and may be easily attached to the supply conduit, even subsequently in already existing machines without substantial alteration of the supply conduit, and that the device is in no way sensitive to dust. An embodiment of the invention is illustrated, by way of example, in the drawings in which:

FIG. 1 is a side elevation of a dispensing and filling machine in part-sectional view, FIG. 2 is a section taken in the plane II—II of FIG. 1, FIG. 3 is a detail view in the plane III—III of FIG. 1, FG. 4 is a wiring diagram of the control means for the adjustment of the volumetric dispensing device, FIG. 5 is a plan view of the machine, and FIG. 6 is a sectional view of a distributor plate of the machine.

Referring to the drawings, it may be seen that a volumetric dispensing machine of known type is provided with a plurality of rotating measuring chambers 1. The measuring volume of the measuring chambers 1 consisting of telescoping cups 101, 102 is centrally adjustable and is changed by raising or lowering the hopper 2 to which the upper cups 101 of the measuring chambers 1 are secured. The lower cups 102 are arranged on a plate 18 and are provided with bottom flaps 103 which, at predetermined time intervals, open the measuring chambers 1 for the purpose of emptying them.

Flowable bulk material is supplied to the machine through a supply tube 3 opening into the hopper 2. During rotation of the hopper, the material is scooped into the measuring chambers 1 by means of a baffle plate 202 secured to the non-rotating cover 201 of the hopper 2. After having been filled, the measuring chambers 1 come into alignment with containers C which are continuously fed to the machine by means of a conveyor belt 92, the said bottom flaps 103 being controlled by a fixed cam rail 104 in such a way that the measured quantities of material are discharged through discharge chutes 106 into the containers C.

For the purpose of checking the density of the material supplied to the machine, a source of radioactive radiation 4 of a well-known commercially available type which is continuously emitting a constant amount of beta or gamma rays, is provided on the supply tube 3 above the hopper 2. The rays penetrate the supply tube 3 and the material in the corresponding zone of the tube 3, whereby the rays are partially absorbed. The remainder of the radiation is received by a detector 5 which is arranged opposite the source of radiation 4, and which may be, for example, a Geiger counter or an ionisation chamber of any commercially available type. In the detector 5, the said remainder of radiation is transformed into a corresponding electric current. The denser the filling material, the weaker will be the current produced by the detector 5. The magnitude of the current, thereof, is thus a measure of the density of the measured material.

The said control voltage is amplified by an amplifier 26 of a well-known commercially available type and conducted to a control relay 6 (FIG. 4) where the incoming measured voltage is compared with a voltage in a bridge circuit arrangement. The counter voltage is generated by a current source 20 and adjusted to a value proportional to the chosen dispensing volume of the measuring chambers 1, by means of a potentiometer 21 which is rigidly mounted on the machine frame 107, and the sliding contact 211 of which is mounted on the cover 201 of the hopper 2. When there is a change in the density of the supplied material, the measuring voltage assumes a value which is different from that of the counter voltage, so that a current will flow through a relay 22. The direction of this current depends on the positive or negative difference of the measuring voltage as compared with the counter voltage. Depending on the direction of the differential current, the relay 22 closes a contact 23 or 24, whereby an increase or a reduction of the dispensing volume of the measuring chambers 1 is effected by raising or lowering of the hopper 2 and its cover 201. Thereby the impedance of the potentiometer 21, and consequently the counter voltage, are also changed until the latter is again equal to the measuring voltage. Due to this elimination of the voltage differential, the relay 22 will re-open the contact 23 or 24, so that the adjusting movement is terminated.

The adjusting movement is derived from the main drive of the machine, so that the adjusting speed is dependent on the filling speed. The machine is driven by an electric motor 40 which through a belt drive 41, worm gearing 42 and gears 43 drives a vertical shaft 9 on which are arranged the driving drum 91 for the conveyor belt 92, the plate 18, and, with the intermediary of an axially displaceable intermediate member 93, the hopper 2. Through the worm gearing 42 and bevel gearing 44, there is further driven a horizontal shaft 45 which through chain gearing 46, 47, 48 is connected with a double clutch 7, 8, 12. The disk 12 of the clutch is rigidly mounted on the drive shaft 49 of the double clutch, which is driven by the chain sprocket 48, whereas the clutch disks 7, 8 and the gears 50, 51 connected with them are loosely supported on the drive shaft 49. In the clutch housing 52, there is further supported a shaft 53 on which are fixed two gears 54, 55, of which the gear 54 meshes directly with gear 51, while the other gear 55 is drivingly connected with gear 50 through an intermediate gear 56. Through the intermediary of chain gearing 57, 58, 59 and a shaft 62, the shaft 53 drives bevel gearing 60, 61 with the bevel gear 61 of which there is connected a spindle 63 supported in the machine frame 107. The spindle 63 with its thread carries the cover 201 of the hopper 2, and through the intermediary of a supporting member 64 the hopper 2 itself which is rotataby suspended on the supporting member 64. For the purpose of preventing rotation of the cover 201, guide pins 65 which slide in corresponding bores of the cover 201. are fixedly mounted in the machine frame.

When the density of the filling material varies, the adjustment of the dispensing volume of the measuring chambers 1 is effected in such a manner that one of the clutch disks 7 or 8 is excited by the closing of contact 23 or 24, whereby the spindle 63 is rotated in one or the other direction by the aforementioned means for transmitting the rotary movement, so that the hopper 2 is raised or lowered.

Frequently, a device detecting the height of material filled into the containers and operating, for example, with photo-electric cells, is used to eliminate insufficiently filled packages prior to their being closed, as for instance disclosed in United States Patent No. 2,529,081. In dispensing apparatus without automatic control means, such detecting devices may be set to relatively close tolerances, since the filling height in the packages will hardly vary in the case of volumetrically normally filled packages. This is no longer the case, however, when the measuring chambers are continuously adjusted in accordance with the density of the material to be packed, i.e. when the quantity to be dispensed is determined not only volumetrically, but in addition thereto also by weight. In such case, there may occur considerable differences in the filling height in spite of correct filling weight, and these differences would require a very large tolerance in the detecting of the filling height. On the other hand, this would entail the disadvantage that at least a part of incorrectly filled packages caused, for example, by residual amounts of material retained by or adhering to the measuring chambers 1 or their closing members, would not be eliminated.

In order to obviate this drawback, the filling height detecting device may be arranged in a vertically displaceable manner, and may be mechanically or electrically coupled with the adjusting means of the measuring chambers, so that the detecting device will be adjusted automatically with the measuring chambers in such a manner that it will always be in the correct position relative to the normal filling height which corresponds to the respective density of the material. This makes it again possible to limit the range of tolerances as small as desired.

In the present embodiment, this is effected by arranging the filling height detecting device comprising a source of light 28 and a photoelectric cell 29, on a slide 31 which is vertically displaceable in a guideway 30. The slide 31 is provided with a female thread into which is screwed a spindle 38. The spindle is drivingly connected with the shaft 53 by means of bevel gears 66, 67, so that together with the adjustment of the dispensing volume there is also adjusted a detecting level of the detecting device 28, 29, which corresponds to the newly adjusted dispensing volume.

What we claim is:

1. A device for dispensing a quantity of material of predetermined weight, said device comprising: a measuring chamber for accommodating a determinable quantity of material, means for varying the volume of said chamber, supply means for supplying the material to said measuring chamber, detection means operatively positioned with respect to said supply means, the detection means comprising a source of radio-active radiation adapted for directing radioactive rays at the material in the supply means, said rays penetrating said material and being reduced in intensity in proportion to the density of the material, a detector aligned with said source and positioned to receive said rays after the same have penetrated said material in the supply means, means coupled to the detector for relating the output therefrom to the density of the material in the supply means, control means coupled to the last said means and the first said means for adjusting the volume of said chamber in response to the density of said material so that said chamber accommodates said predetermined weight of material, and means coupled to said chamber for discharging said material of predetermined weight therefrom.

2. A volumetric device for dispensing material in a quantity of predetermined weight, the device comprising: an adjustable measuring chamber having a variable determinable volume, supply means to supply the material to said chamber, detection means to determine the density of the material in said supply means and control means coupled to said detection means and said chamber for adjusting the volume of the measuring chamber in response to the density of said material so that said chamber accommodates a quantity of material having a predetermined weight, a double clutch actuatable by the detection means, a driving shaft engageable with said double clutch, and gearing means controlled by said double clutch to actuate said control means to adjust the volume of the gearing chamber, a container disposed beneath said measuring chamber and adapted to receive said material therefrom, and means operatively positioned with respect to said container for determining the level of material therein, the last said means being adjustable and controlled by said double clutch in response to the density of said material, whereby said last means assumes a position for determining said level corresponding to the density of said material.

References Cited in the file of this patent

UNITED STATES PATENTS

| | | |
|---|---|---|
| 2,534,352 | Herzog | Dec. 19, 1950 |
| 2,704,079 | Molins et al. | Mar. 15, 1955 |
| 2,750,144 | Beckwith | June 12, 1956 |
| 2,788,896 | Coleman | Apr. 16, 1957 |
| 2,884,130 | Bosch | Apr. 28, 1959 |
| 2,914,676 | Dijkstra | Nov. 24, 1959 |
| 2,932,391 | Broekhysen | Apr. 12, 1960 |
| 2,956,166 | Ohmart | Oct. 11, 1960 |
| 2,964,630 | Bosch | Dec. 13, 1960 |

FOREIGN PATENTS

| | | |
|---|---|---|
| 699,129 | Great Britain | Oct. 28, 1953 |